(12) United States Patent
Nakanishi et al.

(10) Patent No.: US 12,072,314 B2
(45) Date of Patent: Aug. 27, 2024

(54) ELECTROCHEMICAL MEASUREMENT SYSTEM, ELECTROCHEMICAL SEARCH METHOD, REACTOR, AND MICROPLATE

(71) Applicant: National Institute for Materials Science, Ibaraki (JP)

(72) Inventors: Shuji Nakanishi, Osaka (JP); Shoichi Matsuda, Ibaraki (JP)

(73) Assignee: National Institute for Materials Science, Ibaraki (JP)

( * ) Notice: Subject to any disclaimer, the term of this patent is extended or adjusted under 35 U.S.C. 154(b) by 981 days.

(21) Appl. No.: 16/980,955

(22) PCT Filed: Mar. 26, 2019

(86) PCT No.: PCT/JP2019/012988
§ 371 (c)(1),
(2) Date: Sep. 15, 2020

(87) PCT Pub. No.: WO2019/189252
PCT Pub. Date: Oct. 3, 2019

(65) Prior Publication Data
US 2021/0247357 A1 Aug. 12, 2021

(30) Foreign Application Priority Data
Mar. 26, 2018 (JP) .................. 2018-058785

(51) Int. Cl.
*G01N 27/42* (2006.01)
*G01N 27/30* (2006.01)
*G01N 35/02* (2006.01)
(52) U.S. Cl.
CPC ............. *G01N 27/42* (2013.01); *G01N 27/30* (2013.01); *G01N 35/02* (2013.01)
(58) Field of Classification Search
None
See application file for complete search history.

(56) References Cited

U.S. PATENT DOCUMENTS

| 5,643,742 A | 7/1997 | Malin et al. |
| 7,169,362 B2 | 1/2007 | Toi et al. |

(Continued)

FOREIGN PATENT DOCUMENTS

| CN | 106168597 A | 11/2016 |
| JP | 05-240929 A | 9/1993 |

(Continued)

OTHER PUBLICATIONS

T. Siu, et al., "Parallel Electrosynthesis of α-alkoxyamides, and α-alkoxysulfonamides using the spatially addressable electrolysis platform (SAEP)" Journal of Combinatorial Chemistry, 2(5): p. 545-549, Sep. 2000.*

Office Action dated Oct. 25, 2022 for European Application No. 19776759.3.

Ley, C. et al., An electrochemical microtiter plate for parallel spectroelectrochemical measurements, Electrochimica Acta 89, 2013, pp. 98-105.

(Continued)

*Primary Examiner* — J. Christopher Ball
(74) *Attorney, Agent, or Firm* — PATTERSON + SHERIDAN, LLP

(57) ABSTRACT

An electrochemical measurement system (1) includes: an insertion mechanism (4) which is capable of moving relative to a microplate (2) having a plurality of reactors which are arrayed and which contain a respective plurality of types of solutions, the plurality of types of solutions being mixtures of a plurality of types of mother liquids in different proportions; and a microelectrode unit (19) which is attached to the insertion mechanism (4) such that the microelectrode unit (19) is capable of being inserted into the plurality of types of solutions contained in the plurality of reactors.

9 Claims, 15 Drawing Sheets

(56) References Cited

U.S. PATENT DOCUMENTS

| | | |
|---|---|---|
| 8,222,048 B2 | 7/2012 | Fritchie et al. |
| 2005/0089992 A1 | 4/2005 | Walters et al. |
| 2005/0221274 A1 | 10/2005 | Negulescu et al. |
| 2006/0180479 A1 | 8/2006 | Sparkes et al. |
| 2010/0324722 A1 | 12/2010 | Fritchie et al. |
| 2011/0183407 A1 | 7/2011 | Pihl et al. |
| 2013/0137093 A1 | 5/2013 | Fritchie et al. |
| 2014/0127818 A1 | 5/2014 | Fritchie et al. |
| 2015/0276708 A1 | 10/2015 | Kataoka et al. |
| 2016/0077083 A1 | 3/2016 | Teich et al. |
| 2016/0161516 A1 | 6/2016 | Fritchie et al. |
| 2016/0274081 A1 | 9/2016 | Ito et al. |
| 2017/0363571 A1 | 12/2017 | Breedon et al. |
| 2018/0195986 A1 | 7/2018 | Tajima |

FOREIGN PATENT DOCUMENTS

| | | |
|---|---|---|
| JP | 5930961 B2 | 6/2016 |
| WO | 2007038521 A1 | 4/2007 |
| WO | 2017010392 A1 | 1/2017 |

OTHER PUBLICATIONS

Extended European Search Report dated Feb. 18, 2022 for European Patent Application No. 19776759.3.
Office Action dated Apr. 11, 2023 for European Patent Application No. 19776759.3.
International Preliminary Report on Patentability of International Application No. PCT/JP2019/012988 filed Mar. 26, 2019, dated Oct. 8, 2020.
International Search Report of International Application No. PCT/JP2019/012988 filed Mar. 26, 2019, dated Jun. 18, 2019.
Office Action dated Dec. 7, 2021 for Japanese Patent Application No. 2020-510960.
Partial Supplementary European Search Report dated Nov. 5, 2021 for European Application No. 19776759.3.
Office Action dated Apr. 20, 2021 for Japanese Application No. 2020-510960.
Office Action dated Sep. 21, 2021 for Japanese Patent Application No. 2020-510960.

* cited by examiner

| No | | |
|---|---|---|
| 1 | blank | |
| 2 | LiPF6 | 2wt% |
| 3 | LiBF4 | 2wt% |
| 4 | LiAsF6 | 2wt% |
| 5 | LiClO4 | 2wt% |
| 6 | LiBOB | 1wt% |
| 7 | Li3PO4 | 1wt% |
| 8 | LiBr | 2wt% |
| 9 | LiCl | 1wt% |
| 10 | LiF | 1wt% |
| 11 | PC | 10v% |
| 12 | DEC | 10v% |
| 13 | DMC | 10v% |
| 14 | VC | 10v% |
| 15 | FEC | 10v% |
| 16 | blank | |

(b)

| SOLUTION (1) | SOLUTION (2) | SOLUTION (3) | SOLUTION (4) | SOLUTION (5) | No | CE 1st | CE 2nd | CE 3rd | Ave. 2, 3 |
|---|---|---|---|---|---|---|---|---|---|
| 4 | 7 | 8 | 9 | 14 | 1419 | 0.5951 | 0.8860 | 0.9025 | 0.8942 |
| 5 | 6 | 8 | 13 | 15 | 1588 | 0.6422 | 0.8746 | 0.8973 | 0.8860 |
| 6 | 8 | 12 | 13 | 15 | 1839 | 0.5650 | 0.8633 | 0.9024 | 0.8829 |
| 5 | 6 | 11 | 14 | 15 | 1620 | 0.7067 | 0.8839 | 0.8788 | 0.8814 |
| 3 | 5 | 6 | 7 | 11 | 884 | 0.6519 | 0.8636 | 0.8926 | 0.8781 |
| 3 | 6 | 10 | 11 | 13 | 1066 | 0.7466 | 0.8718 | 0.8779 | 0.8748 |
| 2 | 6 | 9 | 13 | 15 | 568 | 0.5060 | 0.8580 | 0.8913 | 0.8746 |
| 3 | 11 | 13 | 14 | 15 | 1209 | 0.7243 | 0.8616 | 0.8851 | 0.8733 |
| 2 | 5 | 7 | 12 | 15 | 446 | 0.6556 | 0.8597 | 0.8851 | 0.8724 |
| 5 | 11 | 12 | 13 | 15 | 1747 | 0.6092 | 0.8560 | 0.8886 | 0.8723 |
| 2 | 4 | 5 | 7 | 14 | 236 | 0.4633 | 0.8689 | 0.8745 | 0.8717 |
| 2 | 5 | 8 | 12 | 15 | 467 | 0.6529 | 0.8565 | 0.8765 | 0.8665 |
| 2 | 5 | 9 | 10 | 12 | 472 | 0.6335 | 0.8457 | 0.8822 | 0.8639 |
| 2 | 5 | 7 | 12 | 14 | 445 | 0.5009 | 0.8502 | 0.8749 | 0.8626 |
| 5 | 6 | 7 | 11 | 13 | 1560 | 0.4964 | 0.8380 | 0.8836 | 0.8608 |
| 2 | 7 | 9 | 11 | 14 | 618 | 0.4848 | 0.8395 | 0.8819 | 0.8607 |
| 3 | 5 | 7 | 13 | 15 | 943 | 0.5551 | 0.8402 | 0.8770 | 0.8586 |
| 2 | 4 | 5 | 8 | 15 | 244 | 0.5278 | 0.8557 | 0.8587 | 0.8572 |

ELECTROCHEMICAL MEASUREMENT SYSTEM, ELECTROCHEMICAL SEARCH METHOD, REACTOR, AND MICROPLATE

TECHNICAL FIELD

The present invention relates to an electrochemical measurement system, an electrochemical screening method, a reactor, and a microplate each of which enables simultaneous electrochemical measurement of a plurality of types of solutions which are mixtures of a plurality of types of mother liquids in different proportions.

BACKGROUND ART

In the field of biotechnology, there is known an automation system using a microplate with multiple wells containing therein a plurality of types of samples which are mixtures of a plurality of types of mother liquids in different proportions (Patent Literatures 1 to 4). This system is a screening system which has been established on the premise that an optical measurement system, which optically measures a plurality of types of samples, is employed as a detection system.

CITATION LIST

Patent Literature

[Patent Literature 1]
Specification of Japanese Patent No. 5930961 (Published on May 13, 2016)
[Patent Literature 2]
Specification of U.S. Pat. No. 8,222,048 (Jul. 17, 2012)
[Patent Literature 3]
Specification of U.S. Pat. No. 7,169,362 (Jan. 30, 2007)
[Patent Literature 4]
Pamphlet of PCT International Application Publication No. 2007/038521 (Apr. 5, 20007)

SUMMARY OF INVENTION

Technical Problem

Screening electrolytes (kinds and amounts of components thereof, additives therein) for new uses requires a large amount of trial and error. However, conventional electrolyte screening relies on operator's experiences, and therefore there has been a demand for making an algorithm of implicit knowledge based on such experiences.

For making such an algorithm, it is necessary to prepare big data based on which the algorithm is made. However, there have been no high-throughput electrochemical measurement systems for use in acquiring such big data.

The systems disclosed in the foregoing Patent Literatures 1 to 4 have an issue in that, because the systems are based on the premise that an optical measurement system which optically measures a plurality of types of samples is employed as a detection system, the systems are not capable of measuring electrical characteristics of electrolytes.

An object of an aspect of the present invention is to provide an electrochemical measurement system, an electrochemical screening method, a reactor, and a microplate each of which enables measurement of electrical characteristics of electrolytes with high throughput.

Solution to Problem

In order to attain the above object, an electrochemical measurement system in accordance with an aspect of the present invention includes: an insertion mechanism capable of moving relative to a plurality of reactors which are arrayed and which contain a respective plurality of types of solutions; and an electrode member which is attached to the insertion mechanism such that the electrode member is capable of being inserted into the plurality of types of solutions contained in the plurality of reactors and which is connected to an electrochemical measurement apparatus.

In order to attain the above object, an electrochemical screening method in accordance with an aspect of the present invention includes the steps of: a) dispensing, in accordance with information relating to dispensing operation, a plurality of types of solutions into a plurality of reactors arranged in a matrix in a microplate, the plurality of types of solutions being mixtures of a plurality of mother liquids in different proportions; b) simultaneously measuring electrical characteristics of the plurality of types of solutions in the respective plurality of reactors by moving an electrode member toward the plurality of reactors so that a plurality of pairs of electrodes attached to the electrode member are simultaneously inserted into the respective plurality of reactors; and c) screening, with high throughput, the plurality of types of solutions to find one or more types of solutions having one or more predetermined electrical characteristics, by statistically processing data of the electrical characteristics of the plurality of types of solutions measured in step b) in accordance with the information relating to dispensing operation.

In order to attain the above object, a reactor in accordance with an aspect of the present invention is a reactor configured to contain a solution, including: a positive electrode which is arranged to be located within the solution in order to measure one or more characteristics of the solution; and a negative electrode which is arranged to be located within the solution such that the negative electrode faces the positive electrode.

In order to attain the above object, a microplate in accordance with an aspect of the present invention is a microplate including a plurality of the reactors in accordance with an aspect of the present invention which are a plurality of wells arranged in a matrix, wherein: each of the plurality of reactors further includes a separator disposed between the positive electrode and the negative electrode; the plurality of reactors are arrayed and contain a respective plurality of types of solutions; and an insertion mechanism moves relative to the plurality of reactors, the insertion mechanism having attached thereto a plurality of electrode members which are capable of being inserted into the plurality of types of solutions contained in the plurality of reactors.

Advantageous Effects of Invention

An aspect of the present invention makes it possible to measure electrical characteristics of electrolytes with high throughput.

Figure 2:
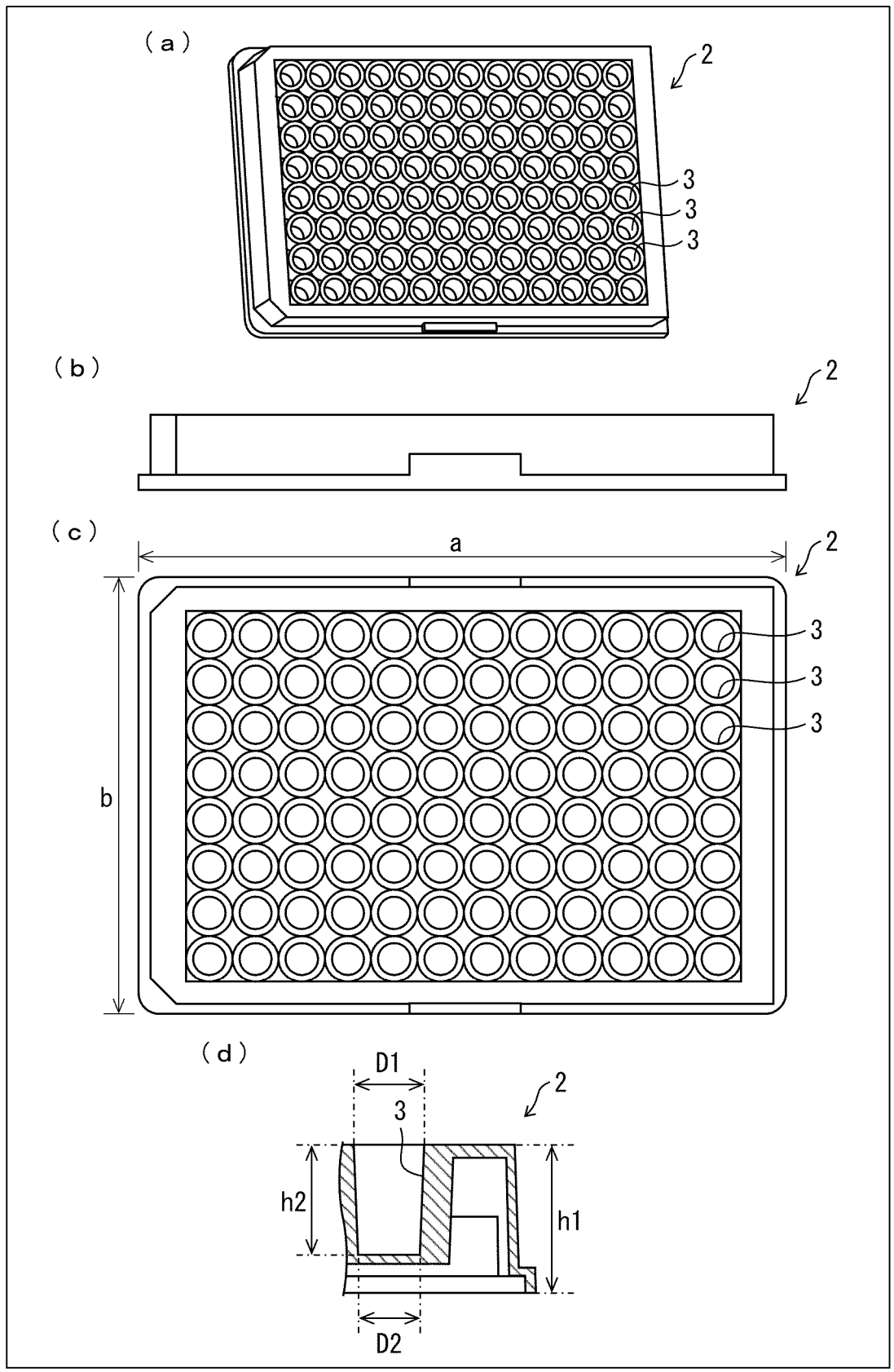

(a) of FIG. 2 is a perspective view of a microplate included in the electrochemical measurement system, (b) of FIG. 2 is an elevational view of the microplate, (c) of FIG. 2 is a plan view of the microplate, and (d) of FIG. 2 is a cross-sectional view of one of wells in the microplate.

Figure 3:
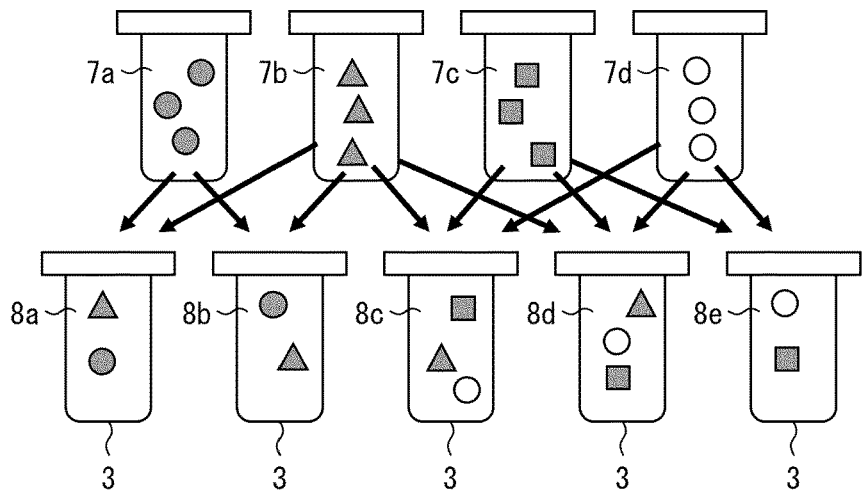

FIG. 3 illustrates high-speed synthesis of an electrolyte compound library in the wells.

Figure 4:
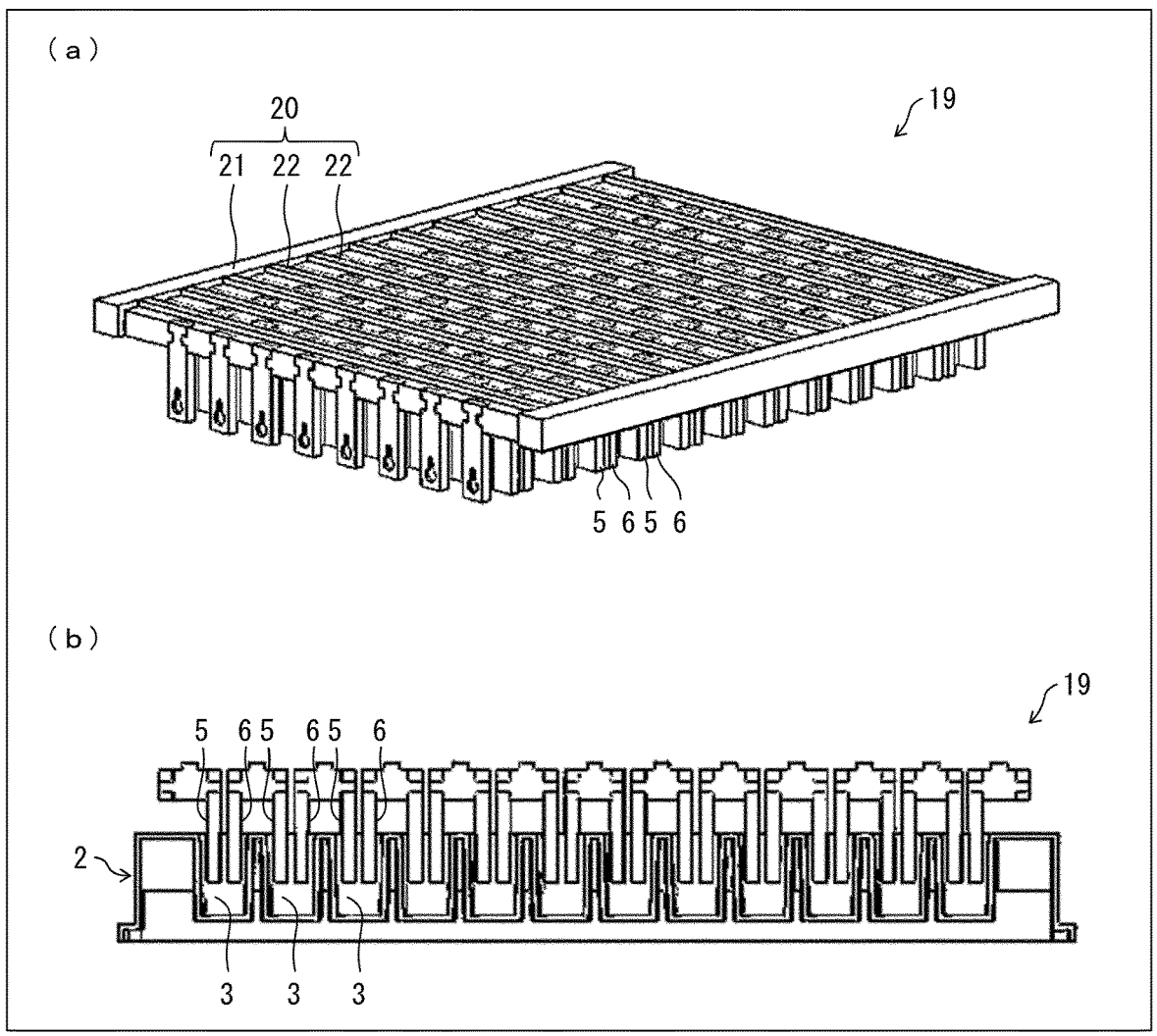

(a) of FIG. 4 is a perspective view of a microelectrode unit included in the electrochemical measurement system, and (b) of FIG. 4 is a cross-sectional view of the microplate in which positive electrodes and negative electrodes of the microelectrode unit are inserted.

Figure 5:
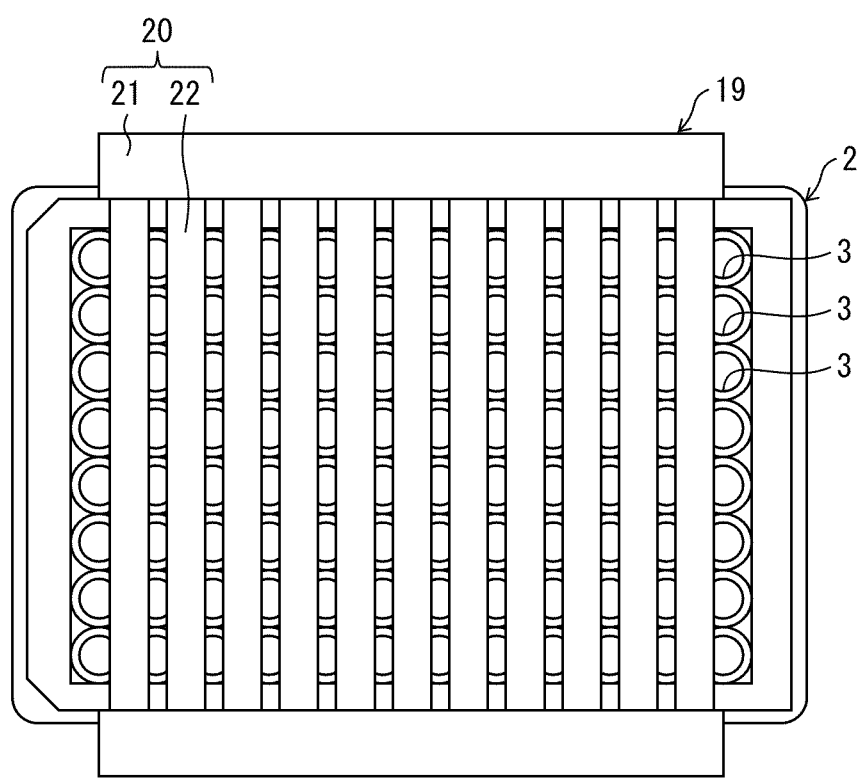

FIG. 5 is a plan view of the microelectrode unit which is inserted in the microplate.

Figure 6:
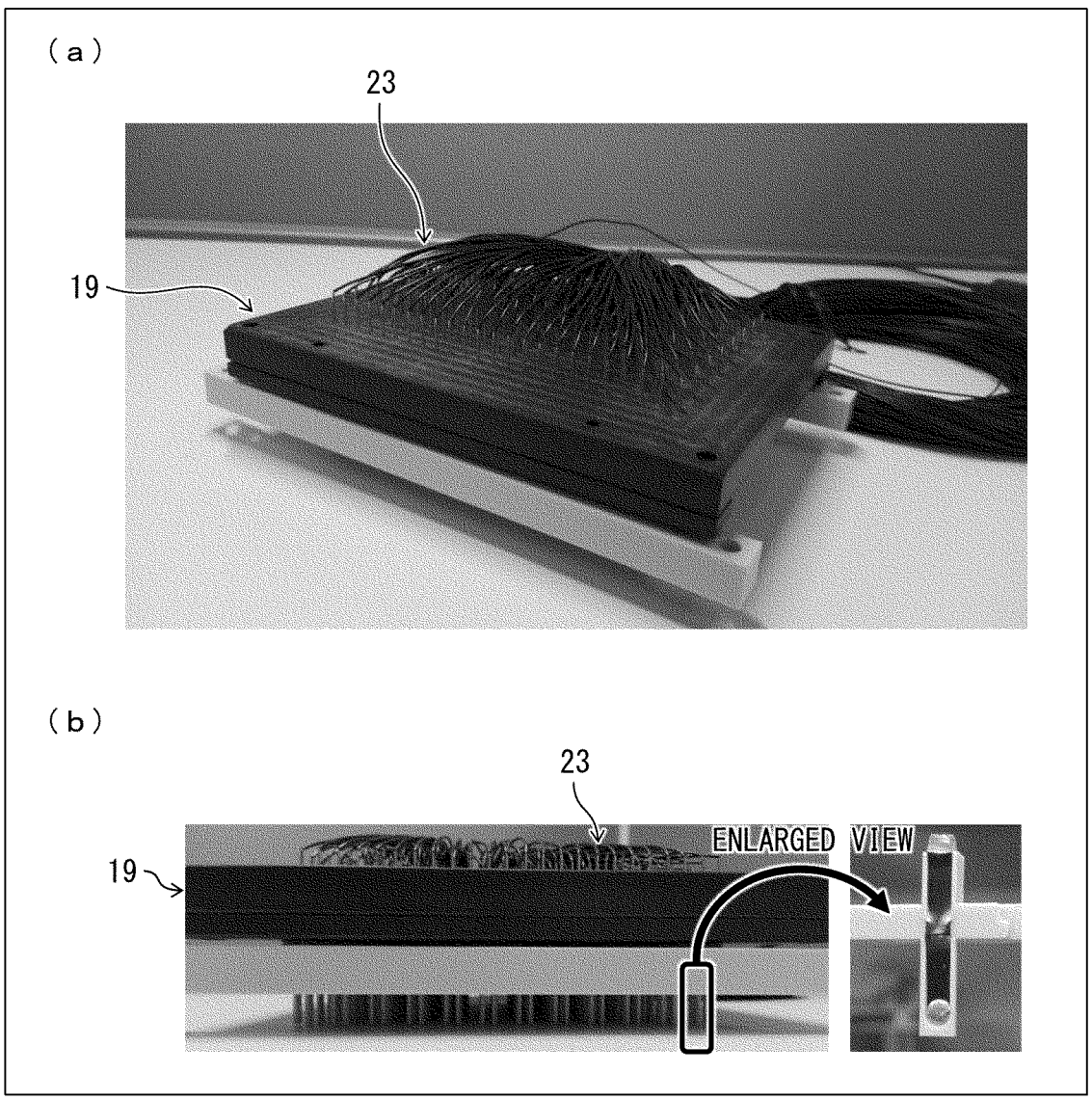

(a) of FIG. 6 is a perspective image of the microelectrode unit which has a probe unit connected thereto. (b) of FIG. 6 is an elevational image of the microelectrode unit.

Figure 7:
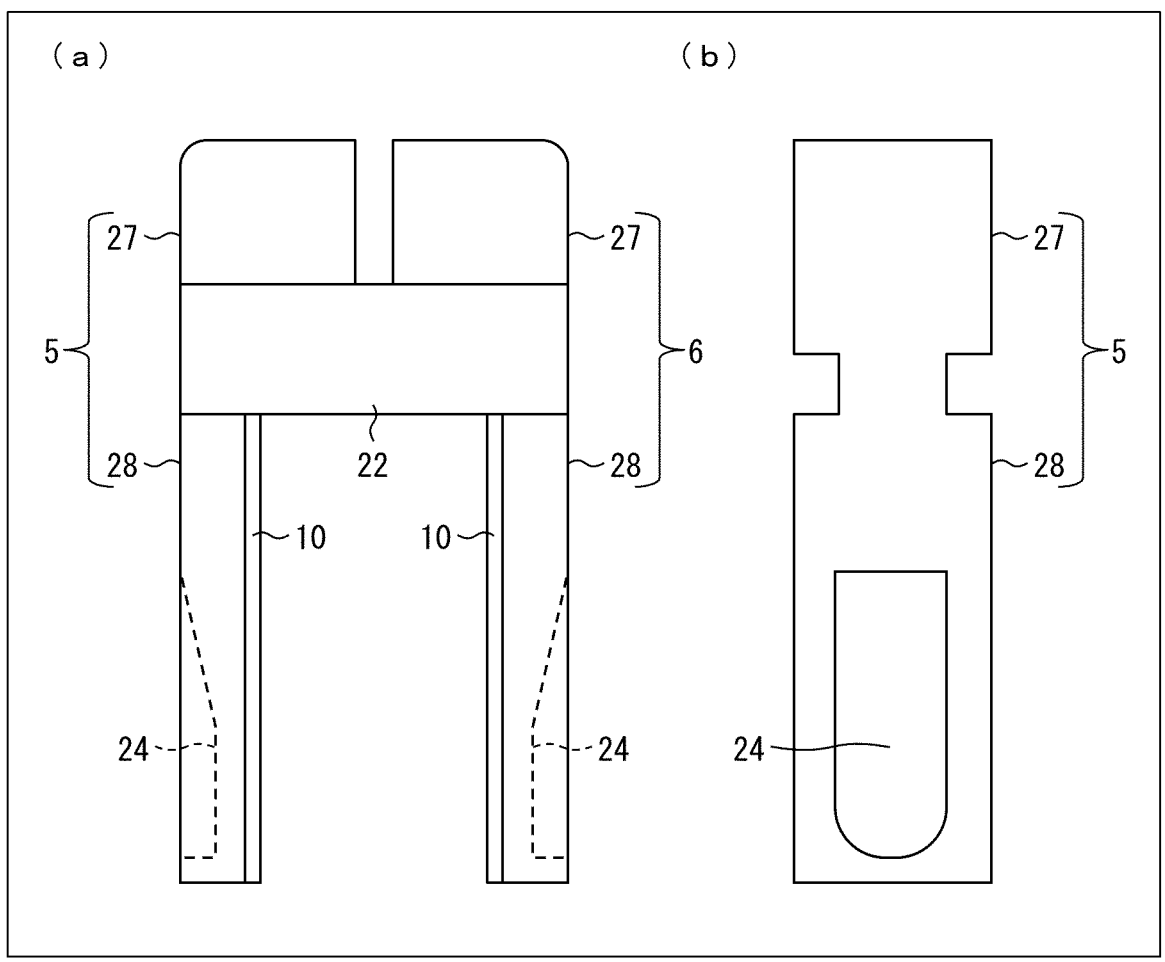

(a) of FIG. 7 is a front view of one of the positive electrodes and one of the negative electrodes included in the microelectrode unit, and (b) of FIG. 7 is a side view of the positive electrode.

Figure 8:
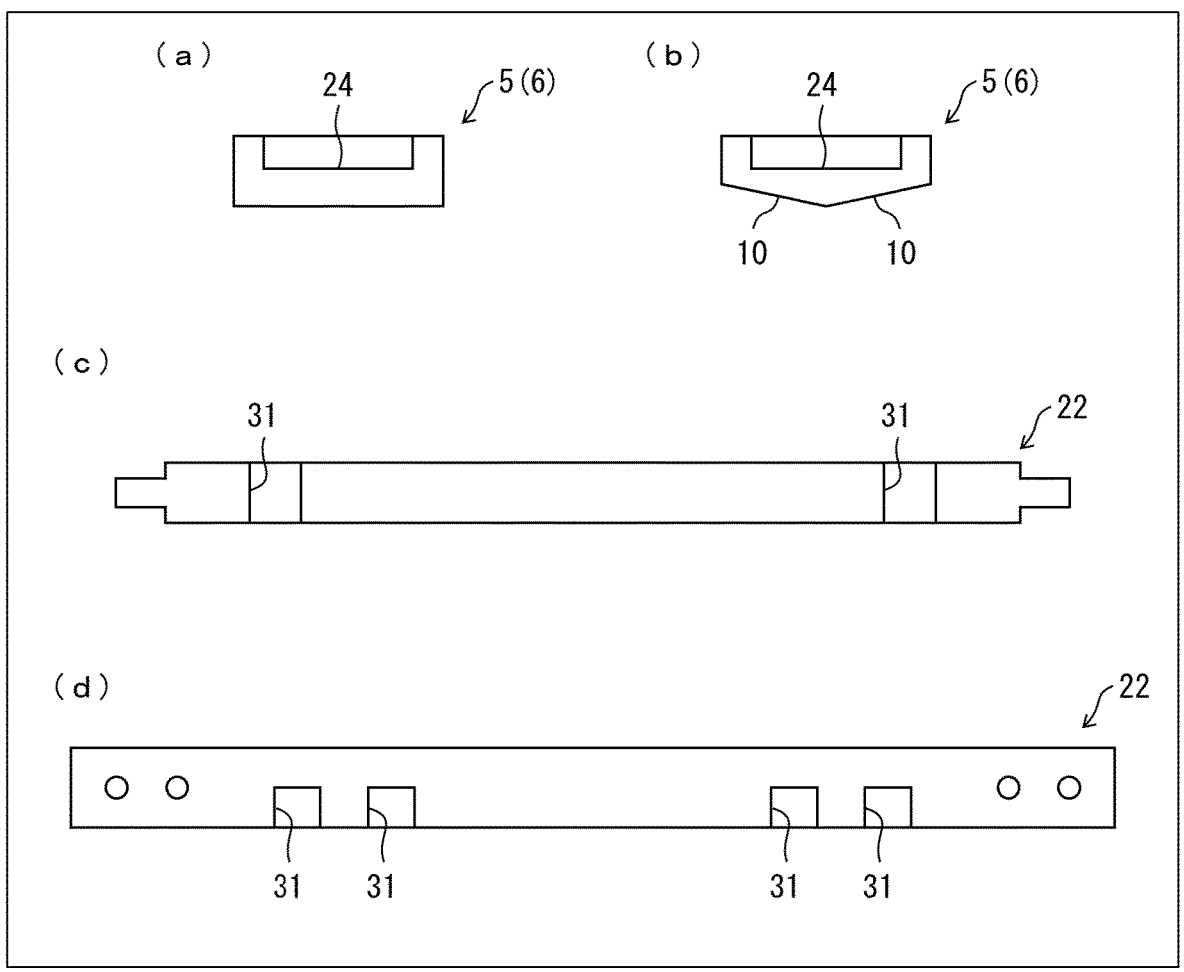

(a) of FIG. 8 is a cross-sectional view of a positive electrode, (b) of FIG. 8 is a cross-sectional view of the positive electrode which has slant faces, (c) of FIG. 8 is a cross-sectional view of one of mount beams included in the microelectrode unit, and (d) of FIG. 8 is a plan view of the mount beam.

Figure 9:
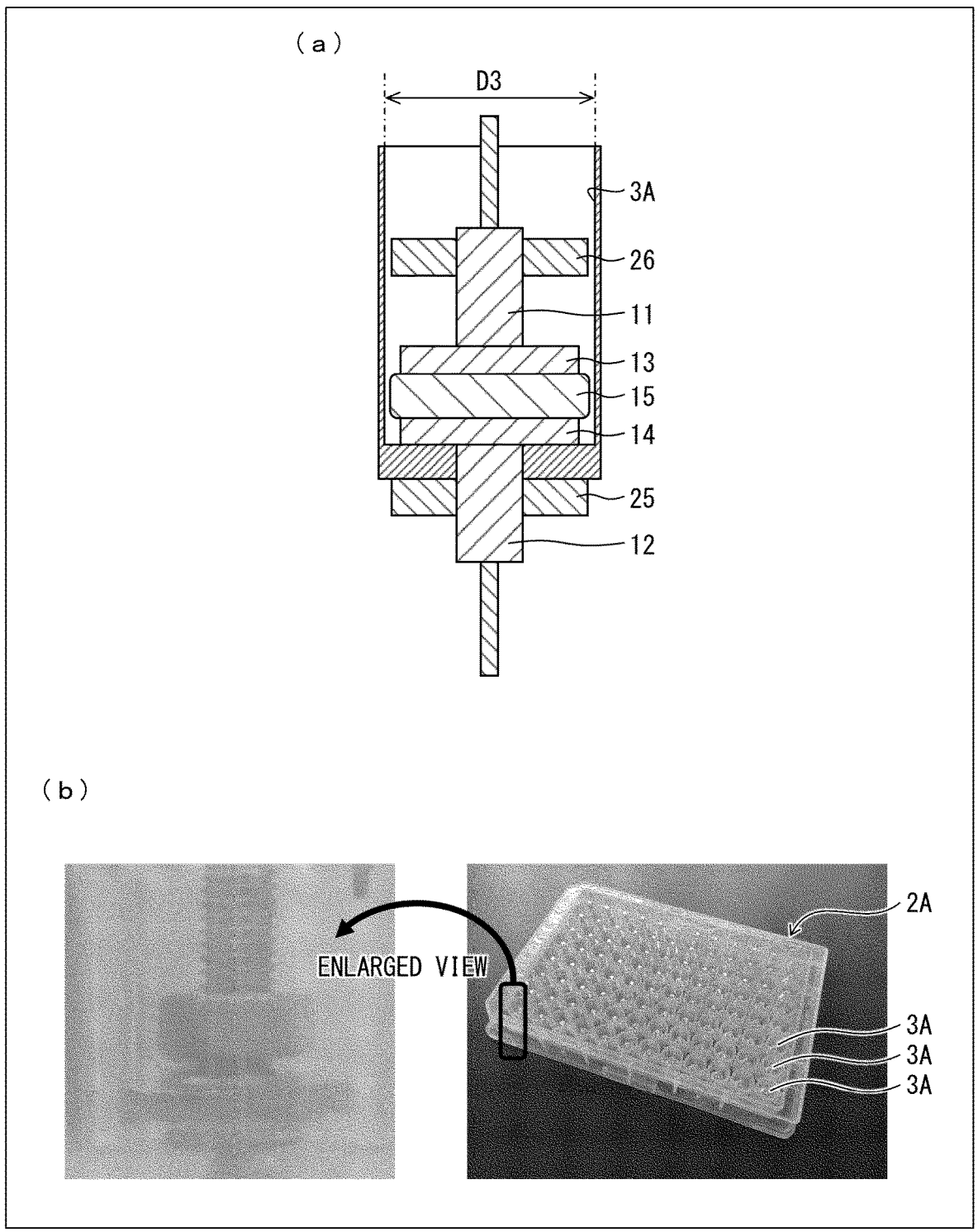

(a) of FIG. 9 is a cross-sectional view of one of wells in a microplate in accordance with Embodiment 2, and (b) of FIG. 9 shows a perspective image of the microplate.

Figure 10:
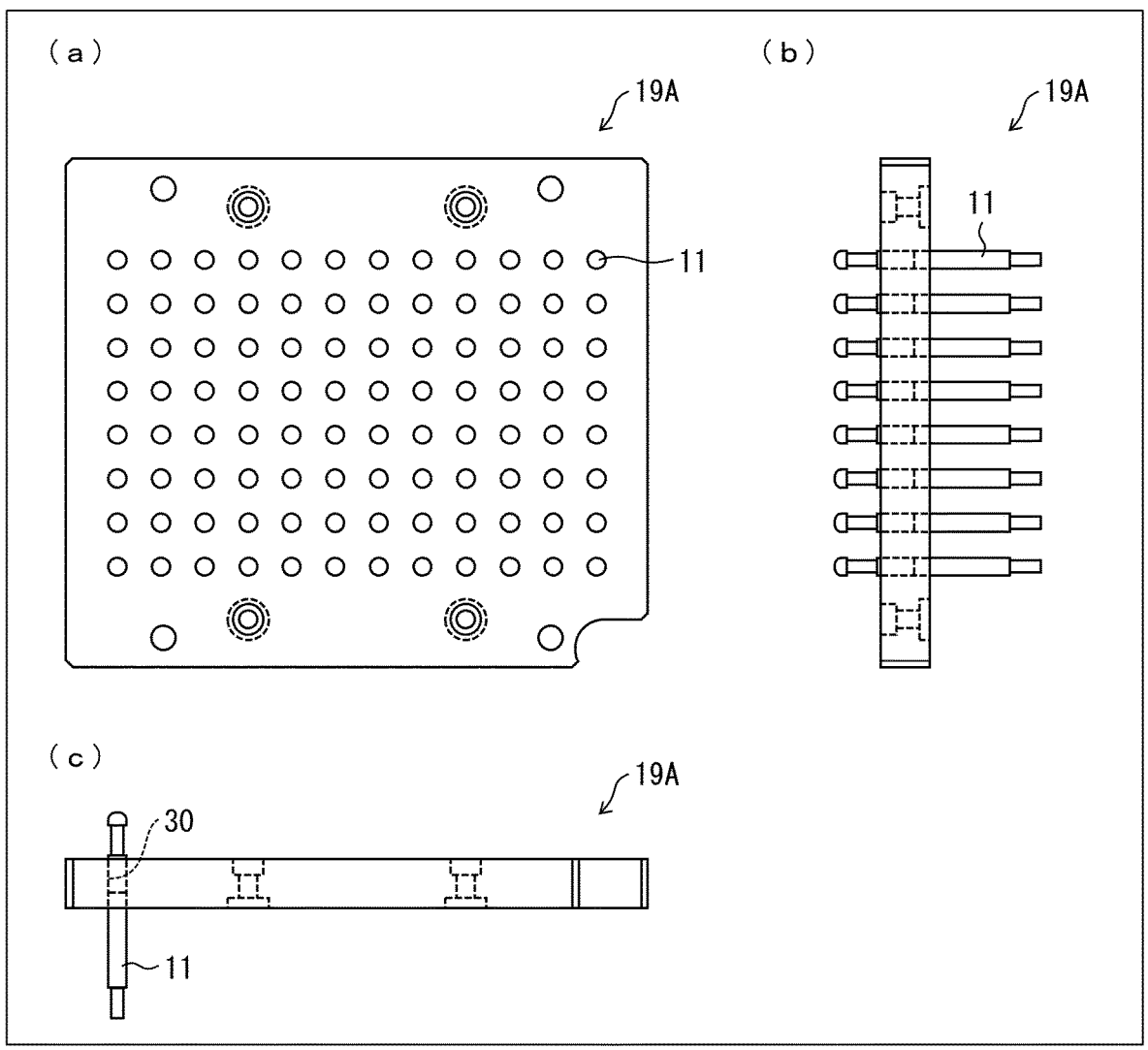

(a) of FIG. 10 is a plan view of a microelectrode unit included in the electrochemical measurement system, and (b) and (c) of FIG. 10 are side views of the microelectrode unit.

Figure 11:
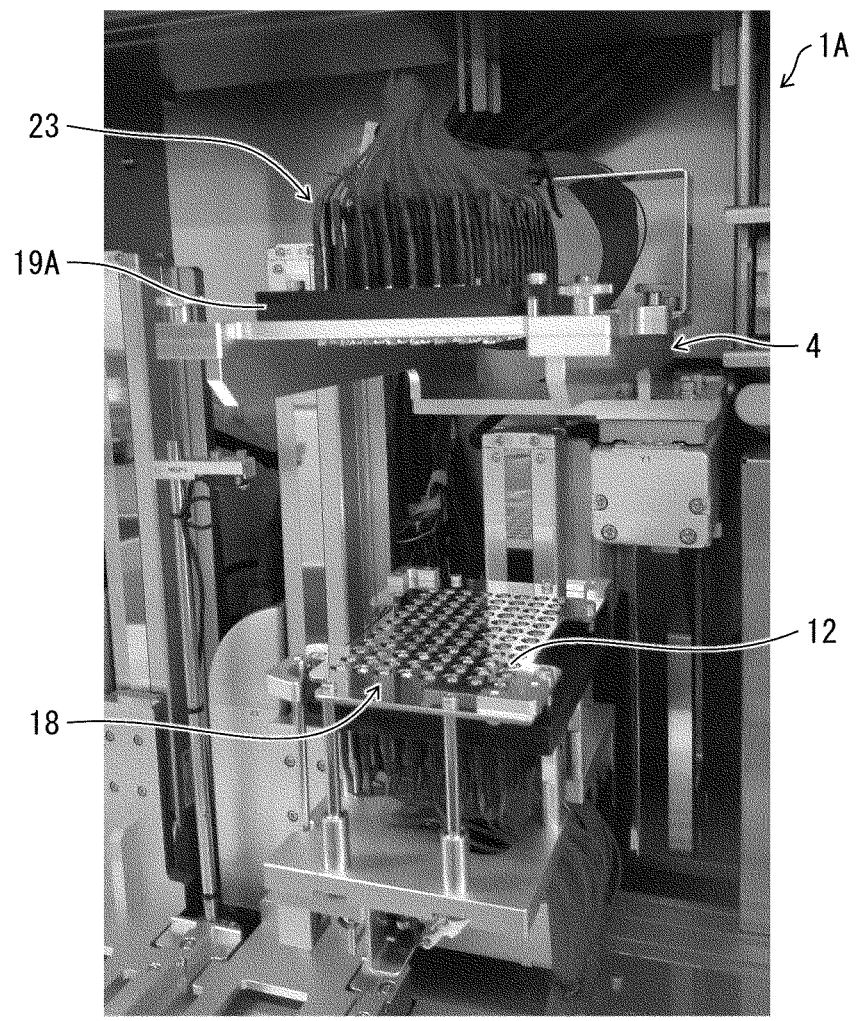

FIG. 11 is an image of an electrochemical measurement system in accordance with Embodiment 2.

(a) of FIG. 12 is a chart showing an electrolyte compound library, which is made up of a plurality of types of mother liquids that are used to prepare a plurality of types of electrolytes measured by the electrochemical measurement system. (b) of FIG. 12 is a chart showing the results of measurement carried out by the electrochemical measurement system.

Figure 13:
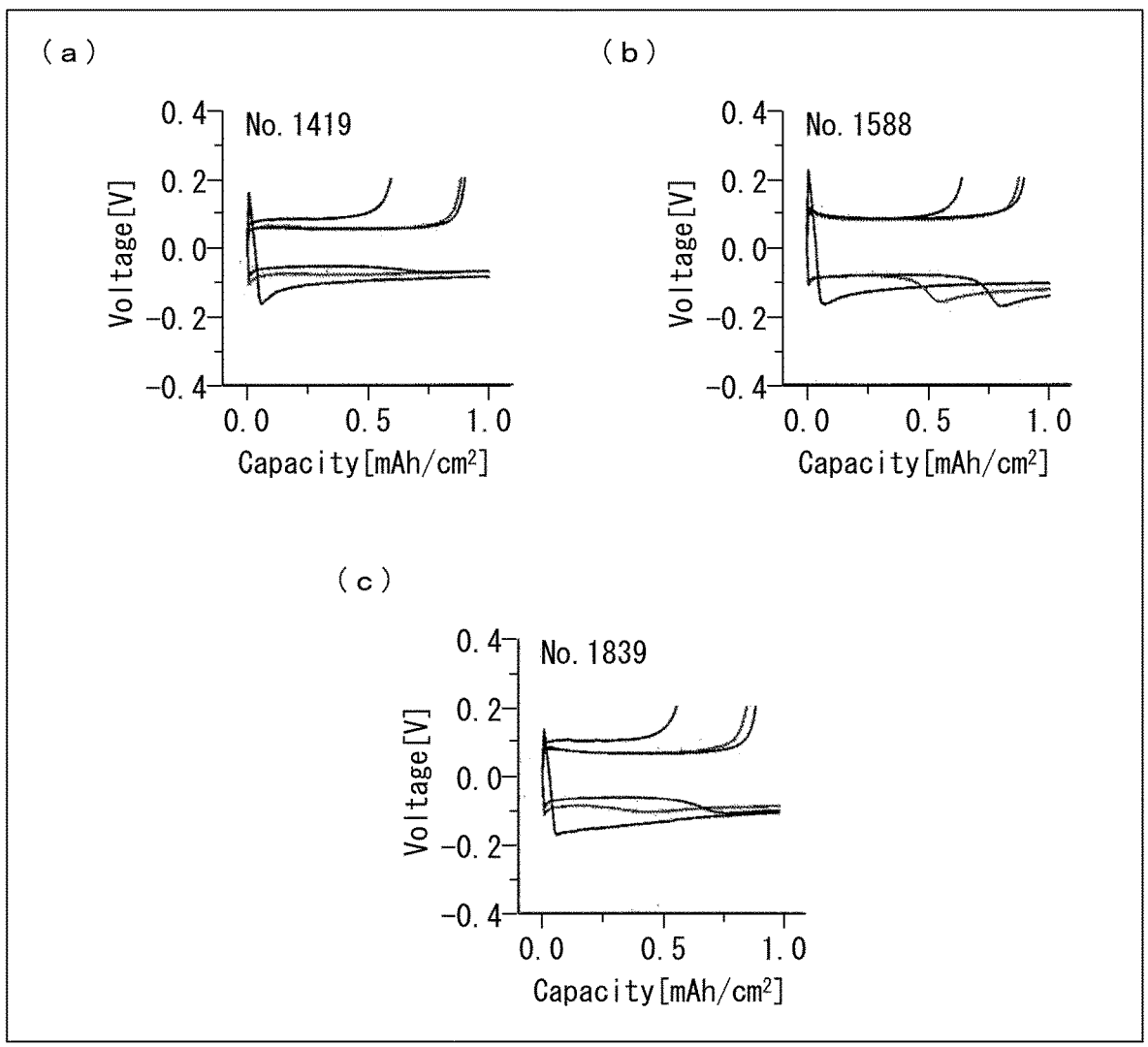

(a) to (c) of FIG. 13 are graphs showing the results of measurement carried out by the electrochemical measurement system.

Figure 14:
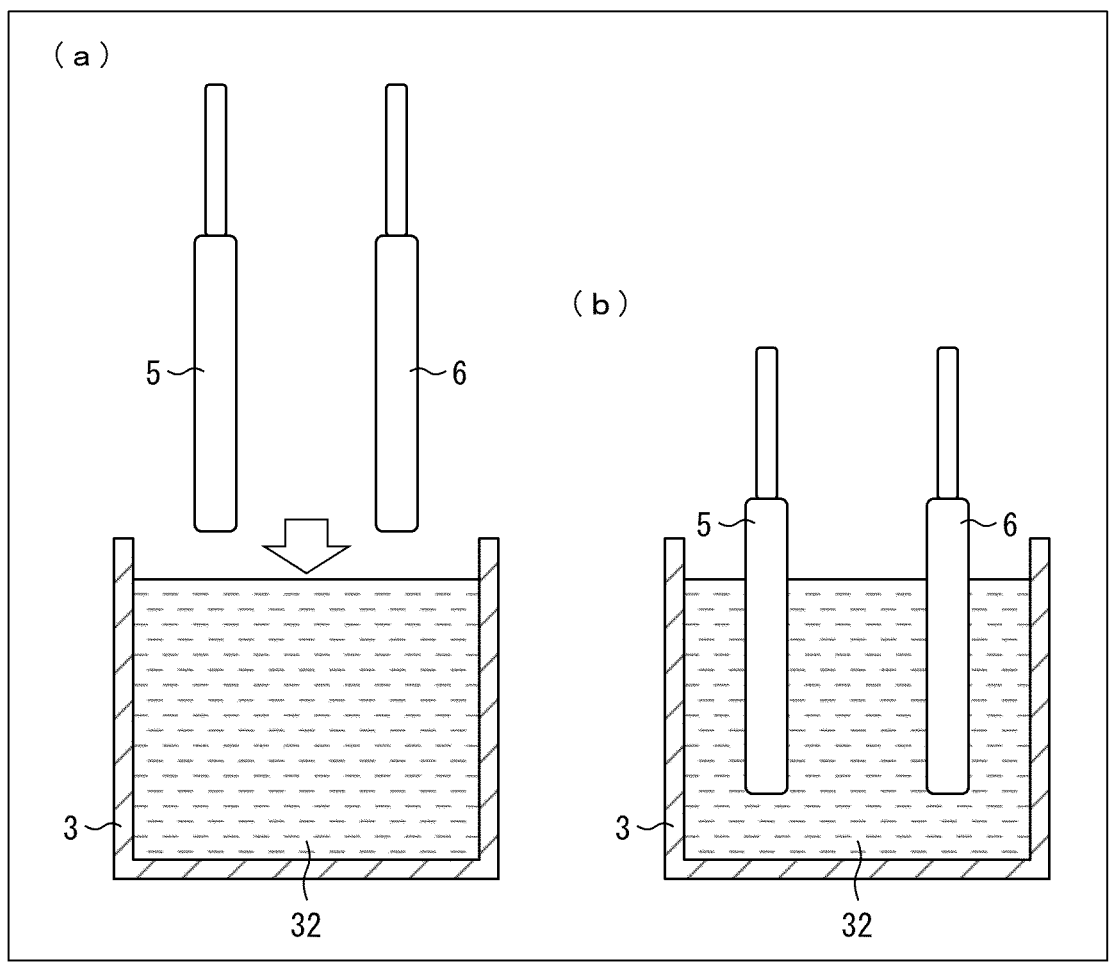

(a) and (b) of FIG. 14 schematically illustrate an aspect of a positive electrode and a negative electrode of the electrochemical measurement system in accordance with Embodiment 1 or 2.

Figure 15:
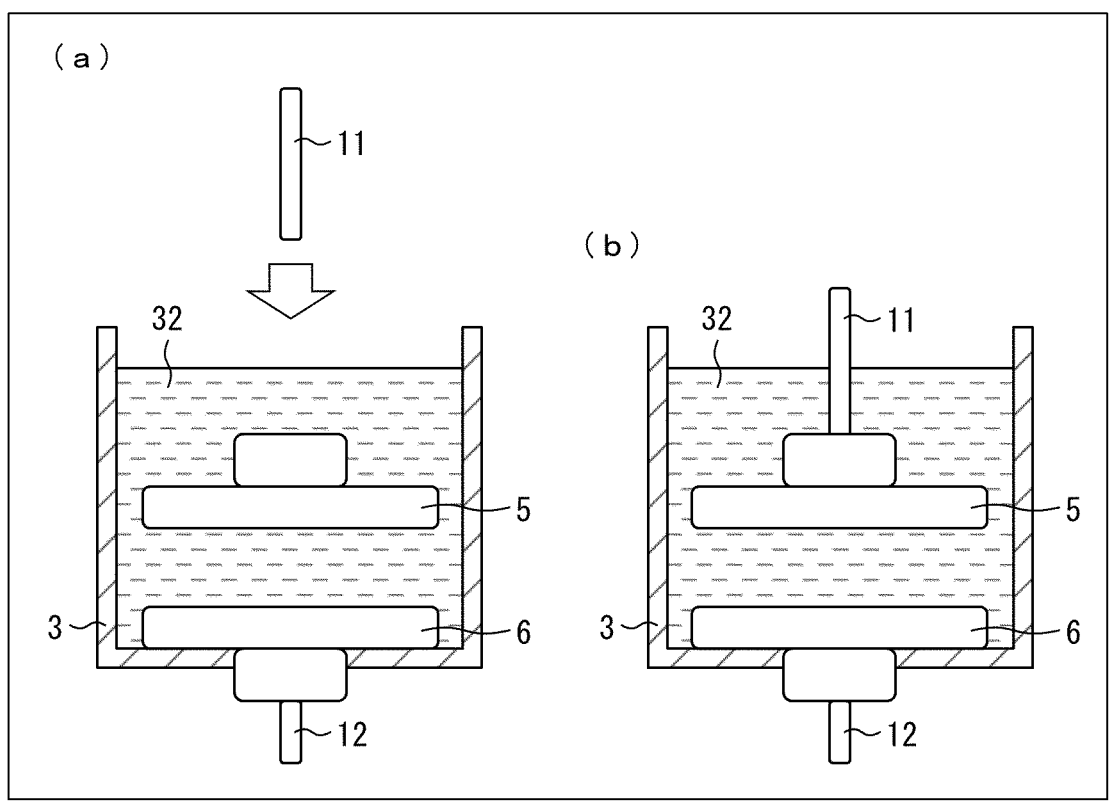

(a) and (b) of FIG. 15 schematically illustrate another aspect of a positive electrode and a negative electrode of the electrochemical measurement system in accordance with Embodiment 1 or 2.

Figure 16:
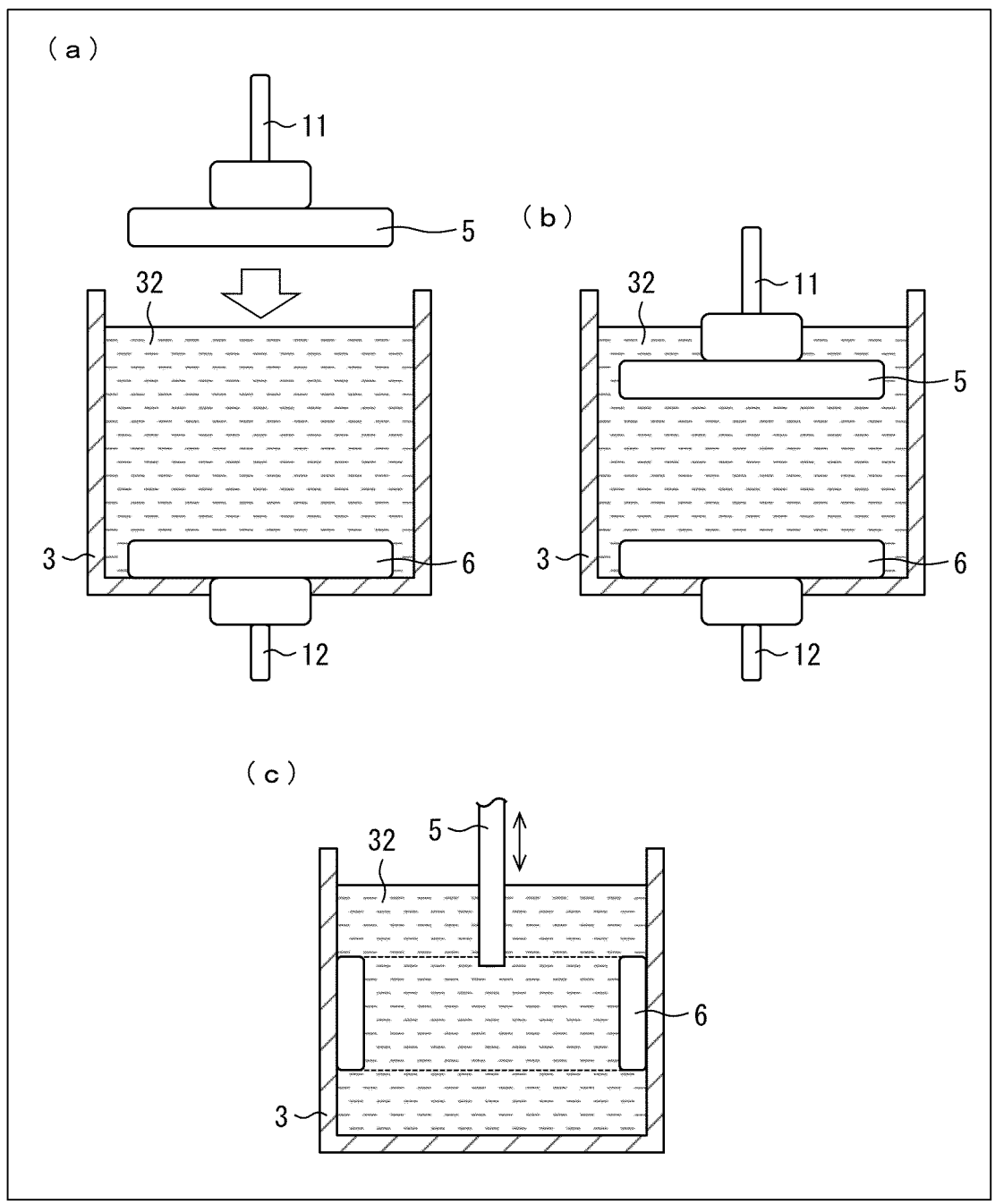

(a), (b), and (c) of FIG. 16 schematically illustrate a further aspect of a positive electrode and a negative electrode of the electrochemical measurement system in accordance with Embodiment 1 or 2.

DESCRIPTION OF EMBODIMENTS

The following description will discuss embodiments of the present invention in detail.

In the present specification, the term "electrolyte" refers to an electrically conductive solution prepared by dissolving an ionic material in a solvent. The term "plating solution" refers to a solution for use in allowing a metal to be deposited on the surface of an object by oxidation or reduction.

Embodiment 1

(Configuration of Electrochemical Measurement System 1)

Figure 1:
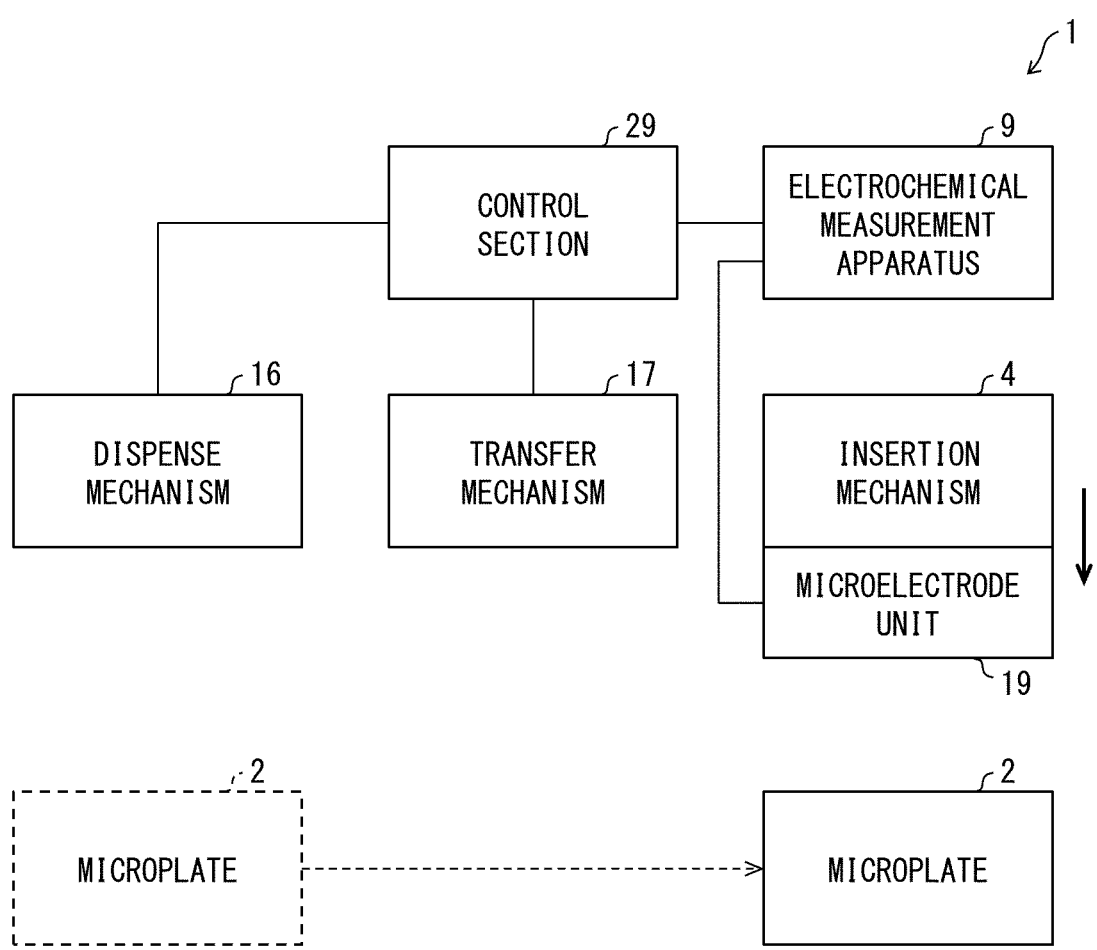
FIG. 1 is a block diagram illustrating an electrochemical measurement system in accordance with Embodiment 1.

FIG. 1 is a block diagram illustrating an electrochemical measurement system 1 in accordance with Embodiment 1. The electrochemical measurement system 1 includes: a dispense mechanism 16 which dispenses, into a microplate 2, a plurality of types of electrolytes (solutions) which are mixtures of a plurality of types of mother liquids in different proportions; a transfer mechanism 17 which transfers the microplate 2 (in which the plurality of types of solutions have been dispensed by the dispense mechanism 16) to a space below an insertion mechanism 4; a microelectrode unit 19 attached to the insertion mechanism 4; an electrochemical measurement apparatus 9 connected to the microelectrode unit 19; and a control section 29 which controls the dispense mechanism 16, the transfer mechanism 17, and the electrochemical measurement apparatus 9.

(a) of FIG. 2 is a perspective view of the microplate 2 included in the electrochemical measurement system 1, (b) of FIG. 2 is an elevational view of the microplate 2, (c) of FIG. 2 is a plan view of the microplate 2, and (d) of FIG. 2 is a cross-sectional view of one of wells 3 in the microplate 2.

The microplate 2 is in the form of a flat plate. The microplate 2 has, in its top surface, 96 wells 3 arranged in a matrix of eight rows by twelve columns. The microplate 2 has a length a, a width b, and a height h1. Each of the wells 3 is substantially in the form of a cylinder, and has a diameter D1 at the top surface, a diameter D2 at the bottom surface, and a depth h2. The microplate 2 is preferably made of a material (e.g., polypropylene) that is not prone to reaction with electrolytes.

The above description is based on an example in which the wells 3 are each substantially in the form of a cylinder; however, the present invention is not limited as such. For example, each of the wells 3 may be substantially in the form of a cone. In a case where each of the wells 3 may be substantially in the form of a cone, the capacities of the wells 3 are smaller than those in a case where the wells 3 are substantially in the form of a cylinder. It follows that a small amount of electrolyte will suffice to carry out electrochemical measurement, as compared to the case where the wells 3 are substantially in the form of a cylinder. This makes it possible, for example, in a case where electrolytes are expensive, to carry out screening at low cost with use of small amounts of electrolytes.

FIG. 3 illustrates high-speed synthesis of an electrolyte compound library in the wells 3. The electrolyte compound library is composed of a plurality of types of mother liquids, and includes, for example, a mother liquid 7a, a mother liquid 7b, a mother liquid 7c, and a mother liquid 7d. A plurality of types of electrolytes, i.e., electrolytes 8a, 8b, 8c, 8d, and 8e, which are mixtures of the plurality of types of mother liquids, i.e., the mother liquids 7a, 7b, 7c, and 7d in different proportions, are dispensed by the dispense mechanism 16 into the wells 3 in the microplate 2.

For example, first, the mother liquid 7a is supplied in predetermined amounts to respective two leftmost wells 3 by the dispense mechanism 16. Next, the mother liquid 7b is supplied in predetermined amounts to respective four leftmost wells 3 by the dispense mechanism 16. Next, the mother liquid 7c is supplied in predetermined amounts to respective three rightmost wells 3. Then, the mother liquid 7d is supplied in predetermined amounts to the respective three rightmost wells 3.

In this way, the plurality of types of electrolytes, i.e., the electrolytes 8a, 8b, 8c, 8d, and 8e, which are mixtures of a plurality of types of mother liquids (the mother liquids 7a, 7b, 7c, and 7d) in different proportions, are dispensed in the wells 3 in the microplate 2.

(a) of FIG. 4 is a perspective view of the microelectrode unit 19 included in the electrochemical measurement system 1, and (b) of FIG. 4 is a cross-sectional view of the microplate 2 in which positive electrodes 5 and negative electrodes 6 of the microelectrode unit 19 are inserted. FIG. 5 is a plan view of the microelectrode unit 19 which is inserted in the microplate 2.

The microelectrode unit 19 includes a base 20 substantially in the form of a flat plate. The base 20 includes: a pair of grips 21 arranged parallel to each other with a certain space between them; and twelve mount beams 22 each of which extends along a direction intersecting the pair of grips 21 and which are arranged parallel to each other such that the spaces between them each correspond to the pitch of the twelve columns of wells 3. Each of the mount beams 22 has, attached thereto, eight pairs of a positive electrode 5 and a negative electrode 6 protruding toward eight wells 3 in a row corresponding to that mount beam 22. The eight pairs of a positive electrode 5 and a negative electrode 6 are attached such that the space between each pair corresponds to the pitch of the eight rows of wells 3 and so as to be capable of being inserted into the eight wells 3 in the corresponding row.

As such, the microelectrode unit 19 is provided with 96 (eight rows by twelve columns) positive electrodes 5 and 96 negative electrodes 6 (eight rows by twelve columns). That is, the microelectrode unit 19 includes 192 microelectrode terminals consisting of the positive electrodes 5 and the negative electrodes 6. Each pair of a positive electrode 5 and a negative electrode 6 is attached to a corresponding mount beam 22 such that the pair is capable of being inserted into a corresponding well 3 of the microplate 2.

(a) of FIG. 6 is a perspective image of the microelectrode unit 19 which has a probe unit 23 connected thereto. (b) of FIG. 6 is an elevational image of the microelectrode unit 19.

The probe unit 23 includes 192 wires connected to the positive electrodes 5 and the negative electrodes 6, respectively. The wires run through the top of the microelectrode unit 19 and are connected to the electrochemical measurement apparatus 9.

The microelectrode unit 19 can be used to, for example, carry out screening of electrolytes for a lithium battery which is a chemical battery whose negative electrode is made of metallic lithium. In this case, each of the positive electrodes 5 includes Ni foil, and each of the negative electrodes 6 includes Li foil.

(a) of FIG. 7 is a front view of one of the positive electrodes 5 and one of the negative electrodes 6 included in the microelectrode unit 19, and (b) of FIG. 7 is a side view of the positive electrode 5. (a) of FIG. 8 is a cross-sectional view of a positive electrode 5, (b) of FIG. 8 is a cross-sectional view of the positive electrode 5 which has slant faces 10, (c) of FIG. 8 is a cross-sectional view of one of the mount beams 22 included in the microelectrode unit 19, and (d) of FIG. 8 is a plan view of the mount beam 22.

The positive electrode 5 and the negative electrode 6 are substantially in the shape of plates which are symmetrical with each other with respect to a plane, and each include an attachment portion 27 for attachment to a corresponding mount beam 22 and an insertion portion 28 for insertion into a corresponding well 3.

The insertion portion 28 has a groove 24 for attachment of an electrode active material.

The positive electrode 5 and the negative electrode 6, when seen from the well 3-side, each have slant faces 10 which are arranged such that the gap between the positive electrode 5 and the negative electrode 6 widens with increasing distance from the center of the gap and with decreasing distance to the opposite ends of the gap. Since the positive electrode 5 and the negative electrode 6 each have the slant faces 10, it is possible to increase the tolerance level of the positional accuracy of the positive electrode 5 and the negative electrode 6 when the positive electrode 5 and the negative electrode 6 are inserted into a corresponding well 3.

Each of the mount beams 22 has press-fit grooves 31 into which the positive electrodes 5 and the negative electrodes 6 are to be press-fit. The positive electrodes 5 and the negative electrodes 6 are press-fit into the press-fit grooves 31 and thereby attached to the mount beam 22.

There are a plurality of the microplates 2 provided. To the plurality of microplates 2, a plurality of types of solutions are dispensed by the dispense mechanism 16 in turn. The plurality of microplates 2 are transferred to the space below the insertion mechanism 4 by the transfer mechanism 17 in turn, and electrochemical measurement is carried out by the microelectrode unit 19 attached to the insertion mechanism 4 and by the electrochemical measurement apparatus 9. Therefore, the same positive electrodes 5 and the same negative electrodes 6 are used for the plurality of microplates 2.

To this end, there is a need to provide a mechanism to put the positive electrodes 5 and the negative electrodes 6 into the wells 3 of each of the microplates 2 and remove the positive electrodes 5 and the negative electrodes 6 from the wells 3 of the microplate 2. Specifically, the insertion mechanism 4 is provided, which raises and lowers the microelectrode unit 19 having the positive electrodes 5 and the negative electrodes 6 attached thereto relative to each microplate 2. The positive electrodes 5 and the negative electrodes 6 have structures that do not interfere with such raising and lowering operations. That is, the positive electrodes 5 and the negative electrodes 6 are attached to the mount beams 22 of the microelectrode unit 19 such that the positive electrodes 5 and the negative electrodes 6 do not interfere with the interior walls of the wells 3 and such that the space between a positive electrode 5 and a negative electrode 6 is appropriate for the electrochemical measurement of an electrolyte contained in a well 3.

The electrochemical measurement apparatus 9 carries out the electrochemical measurement of electrolytes contained in the wells 3 in a manner linked to the dispensing operation by which the electrolytes are dispensed into the wells 3 of the microplate 2 by the dispense mechanism 16. To achieve this, the measurement apparatus 9 carries out the electrochemical measurement of the electrolytes in the wells 3 based on information relating to dispensing operation stored in the control section 29 (FIG. 1) which controls the dispensing operation of the dispense mechanism 16.

(Operation of Electrochemical Measurement System 1)

The electrochemical measurement system 1 configured as such operates as described below.

First, 96 types of electrolytes (which are mixtures of a plurality of types of mother liquids in different proportions) are dispensed by the dispense mechanism 16 into 96 wells 3 in the microplate 2. Next, the microplate 2, in which the 96 types of electrolytes have been dispensed in the 96 wells 3 thereof, is transferred by the transfer mechanism 17 to the space below the insertion mechanism 4. Next, 96 pairs of a positive electrode 5 and a negative electrode 6, which are connected to the electrochemical measurement apparatus 9 and which are attached to the microelectrode unit 19, are lowered toward the 96 wells in which the respective 96 types of electrolytes are contained, and the 96 pairs of a positive electrode 5 and a negative electrode 6 are inserted into the electrolytes. Next, the electrochemical measurement apparatus 9, which is connected to the 96 pairs of a positive electrode 5 and a negative electrode 6, simultaneously measures electrical characteristics of the 96 types of electrolytes in which the respective 96 pairs of a positive electrode 5 and a negative electrode 6 are inserted. Then, the electrochemical measurement apparatus 9 associates the measured electrical characteristics of the 96 types of electrolytes with pieces of information relating to dispensing operation stored in the control section 29.

Embodiment 2

The following description will discuss another embodiment of the present invention. Note that, for convenience of description, members having functions identical to those described in Embodiment 1 are assigned identical referential numerals, and their descriptions are omitted here.

(Configuration of Electrochemical Measurement System 1A)

(a) of FIG. 9 is a cross-sectional view of one of wells 3A in a microplate 2A of an electrochemical measurement system 1A in accordance with Embodiment 2, and (b) of FIG. 9 shows a perspective image of the microplate 2A.

The microplate 2A has 96 wells 3A arranged in a matrix of eight rows by twelve columns. Each of the wells 3A has therein a positive electrode 13, a negative electrode 14, and a separator 15 which is disposed between the positive electrode 13 and the negative electrode 14. The negative electrode 14 is attached to the bottom of the well 3A. The separator 15 is disposed on the negative electrode 14. The positive electrode 13 is disposed on the separator 15. The positive electrode 13 includes nickel foil, the negative electrode 14 contains metallic lithium, and the separator 15 contains glass fiber. The separator 15 only needs to be configured to prevent the contact between the positive electrode 13 and the negative electrode 14, and may be constituted by, for example, a ceramic material or a member such as an O-ring.

A first probe 11 which is capable of being coupled to the positive electrode 13 is attached to a microelectrode unit 19A. The first probe 11 has a nut 26 attached thereto.

For the purpose of simulating a battery environment in each of the wells 3A of the microplate 2A, battery components, which are the positive electrode 13, the negative electrode 14, and the separator 15, are attached inside the well 3A as described above. Specifically, for the purpose of measuring coulombic efficiency of a lithium battery, the microplate 2A, in which the battery components (the positive electrode 13, the negative electrode 14, and the separator 15) similar to actual features of a lithium battery are disposed inside each of the wells 3A thereof, is used. Each of the wells 3A preferably has a flat bottom so that the battery components can be easily attached.

(a) of FIG. 10 is a plan view of the microelectrode unit 19A, and (b) and (c) of FIG. 10 are side views of the microelectrode unit 19A. The microelectrode unit 19A is in the form of a plate, and has 96 holes 30 corresponding to the 96 wells 3A. Ninety-six first probes 11 are press-fit into the respective 96 holes 30.

A second probe 12 which is capable of being coupled to the negative electrode 14 is provided through a hole in the bottom of each of the wells 3A. The second probe 12 has a nut 25 attached thereto. The second probe 12 is connected to the electrochemical measurement apparatus 9. As such, the negative electrode 14 attached inside the well 3A and the electrochemical measurement apparatus 9 are electrochemically coupled together through the second probe 12.

FIG. 11 is an image showing the electrochemical measurement system 1A in accordance with Embodiment 2. The measurement system 1A includes a raising mechanism 18 (moving mechanism) which is provided such that it can ascend relative to the microplate 2A ((b) of FIG. 9) having been transferred to the space below the insertion mechanism 4 and which has the second probes 12 attached thereto such that the second probes 12 are capable of being coupled to the negative electrodes 14.

Each first probe 11 is provided so as to press the positive electrode 13 toward the bottom of the well 3A. The battery components (the positive electrode 13, the negative electrode 14, and the separator 15) provided in the well 3A of the microplate 2A are pressed from above and below by the first probe 11 and the second probe 12, and thereby the electrochemical measurement apparatus 9 and the battery components in the well 3A are electrochemically connected together. By appropriately controlling the pressure applied to press the battery components from above and below by the first probe 11 and the second probe 12 to 400 gf or greater per battery component, it is possible to measure the coulombic efficiency of a lithium battery with good reproducibility. The first probe 11 and the second probe 12 are prepared with structures and conditions that can withstand such pressure conditions.

The negative electrode 14 disposed in the well 3 and the positive electrode 13 disposed on the separator 15 are configured such that they do not interfere with the dispensing operation of the dispense mechanism 16.

The positive electrode 13 in the well 3A, to which the first probe 11 is electrochemically coupled, has a structure that prevents the electrochemical contact between an electrolyte in the well 3A and the first probe 11.

(Operation of Electrochemical Measurement System 1A)

The electrochemical measurement system 1A configured as such operates as described below.

First, 96 types of electrolytes (which are mixtures of a plurality of types of mother liquids in different proportions) are dispensed by the dispense mechanism 16 into 96 wells 3A in the microplate 2A in which battery components are provided. Next, the microplate 2A, in which the 96 types of electrolytes have been dispensed in the 96 wells 3A thereof, is transferred by the transfer mechanism 17 to the space below the insertion mechanism 4.

Next, the raising mechanism 18, having the second probes 12 attached thereto, ascends toward the 96 wells 3A in which the respective 96 types of electrolytes are contained. Next, the 96 second probes 12 attached to the raising mechanism 18 pass through the holes in the bottoms of the wells 3A and are coupled to the negative electrodes 14. Next, the 96 first probes 11, which are connected to the electrochemical measurement apparatus 9 and attached to the microelectrode unit 19A, descend and are coupled to the positive electrodes 13 in the respective wells 3A. The 96 first probes 11 press the respective positive electrodes 13 toward the bottoms of the respective wells 3A.

Next, the electrochemical measurement apparatus 9, which is connected to the 96 first probes 11 and the 96 second probes 12, simultaneously measures electrical characteristics of the 96 types of electrolytes in the 96 wells 3A. Then, the electrochemical measurement apparatus 9 associates the measured electrical characteristics of the 96 types of electrolytes with pieces of information relating to dispensing operation stored in the control section 29.

(Results of Measurement of Coulombic Efficiency of Lithium Battery)

(a) of FIG. 12 is a chart showing an electrolyte compound library, which is made up of a plurality of types of mother liquids that are used to prepare the plurality of types of electrolytes measured by the electrochemical measurement system 1A. (b) of FIG. 12 is a chart showing the results of measurement carried out by the electrochemical measurement system 1A.

The coulombic efficiency of a lithium battery was measured with use of electrolytes in the wells 3A. Five types of electrolyte compounds were selected from fourteen types of electrolyte compounds numbered 2 to 15 shown in (a) of FIG. 12, and were dispensed to obtain 2002 types of electrolytes. All the 2002 types of electrolytes were examined with use of the electrochemical measurement system 1A.

Solutions (1) to (5) shown in (b) of FIG. 12 are indicative of serial numbers of the five types of electrolyte compounds selected from the fourteen types of electrolyte compounds. The numeric values in the columns of the solutions (1) to (5) each indicate the concentration of a corresponding electrolyte. The numbers in the "No." column are serial numbers of the 2002 types of electrolytes obtained by selecting five types of electrolyte compounds from the fourteen types of electrolyte compounds in the electrolyte compound library and dispensing the five types of electrolyte compounds. Each numeric value in the "CE 1st" column is a value obtained by first measurement of the coulombic efficiency of a lithium battery, each numeric value in the "CE 2nd" column is a value obtained by second measurement, and each numeric value in the "CE 3rd" column is a value obtained by third measurement. Each numeric value in the "Ave. 2.3" column is the average of the value obtained by the second measurement and the value obtained by the third measurement. There are actually 2002 rows of data. Out of these rows of data, the top eighteen rows of data ranked in descending order in terms of the above-mentioned average are shown in (b) of FIG. 12.

(a) to (c) of FIG. 13 are graphs showing the results of measurement carried out by the electrochemical measurement system 1A. The graphs show charge/discharge data of top three electrolytes ranked in descending order in terms of the average of the value obtained by second measurement and the value obtained by third measurement in (b) of FIG. 12. (a) of FIG. 13 is a graph showing charge/discharge of electrolyte No. 1419 in (b) of FIG. 12, (b) of FIG. 13 is a graph showing charge/discharge of electrolyte No. 1588, and (c) of FIG. 13 is a graph showing charge/discharge of electrolyte No. 1839.

As such, according to the electrochemical measurement system 1A in accordance with Embodiment 2, it was possible to simultaneously measure 96 types of electrolytes for their coulombic efficiency of a lithium battery, and possible to find suitable electrolytes, i.e., the electrolytes No. 1419, No. 1588, and No. 1839, by screening the 2002 types of electrolytes with high throughput.

Note that the descriptions having been made so far are based on an example in which the coulombic efficiency of a lithium battery is measured. However, the present invention is not limited as such, provided that the present invention is applied to electrochemical measurement. The present invention can also be applied to, for example, measurement of plating solutions.

FIGS. 14 to 16 schematically illustrate aspects of a positive electrode 5 and a negative electrode 6 of the electrochemical measurement system in accordance with Embodiment 1 or 2. Note that, for convenience of description, members having functions identical to those described in Embodiments 1 and 2 are assigned identical referential numerals, and their descriptions are omitted here.

The positive electrode 5 and the negative electrode 6 can be attached to the microelectrode unit 19 (FIG. 1, FIG. 4). In this case, as illustrated in (a) and (b) of FIG. 14, the positive electrode 5 and the negative electrode 6 are inserted into an electrolyte 32 contained in one of the wells 3 of the microplate 2 (FIG. 1) as the microelectrode unit 19 descends.

The positive electrode 5 and the negative electrode 6 may be attached to the well 3 as illustrated in (a) and (b) of FIG. 15. In this case, for example, the negative electrode 6 is attached to the bottom of the well 3, and the second probe 12 connected to the electrochemical measurement apparatus 9 (FIG. 1) is connected to the negative electrode 6. The positive electrode 5 is disposed in the electrolyte 32 so as to face the negative electrode 6. The first probe 11 is brought into connection with the positive electrode 5 disposed in the electrolyte 32 as the microelectrode unit 19 descends.

Note that the above description is based on an example in which the negative electrode 6 is attached to the bottom of the well 3; however, the present invention is not limited as such. The following arrangement may be employed: the positive electrode 5 and the negative electrode 6 are attached to the interior wall of the well 3 such that the positive electrode 5 and the negative electrode 6 face each other.

Alternatively, the following arrangement may be employed, as illustrated in (a) and (b) of FIG. 16: the positive electrode 5 is attached to the first probe 11 of the microelectrode unit 19; and the negative electrode 6 is attached to the bottom of the well 3. In this case, the electrode 5 attached to the first probe 11 of the microelectrode unit 19 goes into the electrolyte 32 and faces the negative electrode 6 as the microelectrode unit 19 descends.

Alternatively, the following arrangement may be employed, as illustrated in (c) of FIG. 16: the negative electrode 6 is disposed on the interior wall of the well 3.

Aspects of the present invention can also be expressed as follows.

In order to attain the foregoing object, an electrochemical measurement system in accordance with an aspect of the present invention includes: an insertion mechanism capable of moving relative to a plurality of reactors which are arrayed and which contain a respective plurality of types of solutions; and an electrode member which is attached to the insertion mechanism such that the electrode member is capable of being inserted into the plurality of types of solutions contained in the plurality of reactors and which is connected to an electrochemical measurement apparatus.

The above features make it possible to simultaneously measure electrochemical characteristics of a plurality of types of solutions which are mixtures of a plurality of types of mother liquids in different proportions. This makes it possible to measure electrical characteristics of electrolytes with high throughput.

An electrochemical measurement system in accordance with an aspect of the present invention is preferably arranged such that each of the plurality of types of solutions contains at least one of (i) an electrolyte obtained by dissolving an ionic material in a solvent and (ii) a plating solution for use in allowing a metal to be deposited on a surface of an object by oxidation or reduction.

An electrochemical measurement system in accordance with an aspect of the present invention preferably further includes a plurality of pairs of electrodes for use in measuring electrical characteristics of the respective plurality of types of solutions, and is preferably arranged such that: the plurality of pairs are attached to the electrode member; the plurality of pairs are attached to the respective plurality of reactors; or one of the electrodes in each of the plurality of pairs is attached to the electrode member and the other is attached to a corresponding one of the plurality of reactors An electrochemical measurement system in accordance with an aspect of the present invention is preferably arranged such that the electrode member includes a plurality of pairs of electrodes which protrude toward the respective corresponding plurality of reactors.

An electrochemical measurement system in accordance with an aspect of the present invention is preferably arranged such that each of the electrodes in each of the plurality of pairs has slant faces which are arranged such that a gap between the electrodes widens with increasing distance from a center of the gap and with decreasing distance to opposite ends of the gap when seen from a corresponding one of the plurality of reactors.

An electrochemical measurement system in accordance with an aspect of the present invention preferably further includes, for each of the plurality of reactors: a pair of electrodes and a separator disposed between the electrodes, the pair and the separator being disposed inside the each of the plurality of reactors; a first probe which is included in the electrode member and which is capable of being coupled to one of the electrodes in the pair; and a second probe which is connected to the electrochemical measurement apparatus and which is capable of being coupled to the other of the electrodes in the pair.

An electrochemical measurement system in accordance with an aspect of the present invention is preferably arranged such that: the one of the electrodes in the pair is attached to a bottom of the each of the plurality of reactors; the separator is disposed on the one of the electrodes in the pair; the other of the electrodes in the pair is disposed on the separator; and the first probe is provided so as to press the other of the electrodes in the pair toward the bottom of the each of the plurality of reactors.

An electrochemical measurement system in accordance with an aspect of the present invention is preferably arranged such that the plurality of reactors are a plurality of wells arranged in a matrix in a microplate, and the electrochemical measurement system further includes: a dispense mechanism configured to dispense the plurality of types of solutions into the respective plurality of wells in the microplate, the plurality of types of solutions being mixtures of the plurality of types of mother liquids in different proportions, a transfer mechanism configured to transfer, to a space below the insertion mechanism, the microplate having dispensed therein the plurality of types of solutions; and a moving mechanism which is capable of moving relative to the microplate in the space below the insertion mechanism and which has the second probe attached thereto such that the second probe is capable of being coupled to the one of the electrodes in the pair.

An electrochemical measurement system in accordance with an aspect of the present invention is preferably arranged such that: the plurality of reactors are a plurality of wells arranged in a matrix in a microplate; and the plurality of types of solutions contain a respective plurality of types of electrolytes.

In order to attain the foregoing object, an electrochemical screening method in accordance with an aspect of the present invention includes the steps of: a) dispensing, in accordance with information relating to dispensing operation, a plurality of types of solutions into a plurality of reactors arranged in a matrix in a microplate, the plurality of types of solutions being mixtures of a plurality of mother liquids in different proportions; b) simultaneously measuring electrical characteristics of the plurality of types of solutions in the respective plurality of reactors by moving an electrode member toward the plurality of reactors so that a plurality of pairs of electrodes attached to the electrode member are simultaneously inserted into the respective plurality of reactors; and c) screening, with high throughput, the plurality of types of solutions to find one or more types of solutions having one or more predetermined electrical characteristics, by statistically processing data of the electrical characteristics of the plurality of types of solutions measured in step b) in accordance with the information relating to dispensing operation.

In order to attain the foregoing object, a reactor in accordance with an aspect of the present invention is a reactor configured to contain a solution, including: a positive electrode which is arranged to be located within the solution in order to measure one or more characteristics of the solution; and a negative electrode which is arranged to be located within the solution such that the negative electrode faces the positive electrode.

In order to attain the foregoing object, a microplate in accordance with an aspect of the present invention includes a plurality of the reactors in accordance with an aspect of the present invention which are a plurality of wells arranged in a matrix, wherein: each of the plurality of reactors further includes a separator disposed between the positive electrode and the negative electrode; the plurality of reactors are arrayed and contain a respective plurality of types of solutions; and an insertion mechanism moves relative to the plurality of reactors, the insertion mechanism having attached thereto a plurality of electrode members which are capable of being inserted into the plurality of types of solutions contained in the plurality of reactors.

The present invention is not limited to the embodiments, but can be altered by a skilled person in the art within the scope of the claims. The present invention also encompasses, in its technical scope, any embodiment derived by combining technical means disclosed in differing embodiments.

REFERENCE SIGNS LIST 1 electrochemical measurement system
2 microplate
3 well (reactor)
4 insertion mechanism
5 positive electrode (pair of electrodes)
6 negative electrode (pair of electrodes)
7a to 7d mother liquid
8a to 8e electrolyte (solution)
9 electrochemical measurement apparatus
10 slant face
11 first probe
12 second probe
13 positive electrode (pair of electrodes)
14 negative electrode (pair of electrodes)
15 separator
16 dispense mechanism
17 transfer mechanism 18 raising mechanism (moving mechanism)
19 microelectrode unit (electrode member)
20 base
21 grip
22 mount beams
23 probe unit
24 groove

The invention claimed is:

1. An electrochemical measurement system comprising:
a plurality of reactors which are arrayed and which contain a respective plurality of types of solutions;
an electrode member configured to be inserted into the plurality of types of solutions contained in the plurality of reactors;
a pair of electrodes and a separator disposed between the electrodes, the pair of electrodes and the separator being disposed inside each of the plurality of reactors;
a first probe which is included in the electrode member and which is configured to be coupled to one of the electrodes in the pair; and
a second probe which is connected to an electrochemical measurement apparatus and which is configured to be coupled to the other of the electrodes in the pair.

2. The electrochemical measurement system as set forth in claim 1, wherein each of the plurality of types of solutions contains at least one of (i) an electrolyte obtained by dissolving an ionic material in a solvent and (ii) a plating solution for use in allowing a metal to be deposited on a surface of an object by oxidation or reduction.

3. The electrochemical measurement system as set forth in claim 1, wherein:
the one of the electrodes in the pair is attached to a bottom of the each of the plurality of reactors;
the separator is disposed on the one of the electrodes in the pair;
the other of the electrodes in the pair is disposed on the separator; and
the first probe is provided so as to press the other of the electrodes in the pair toward the bottom of the each of the plurality of reactors.

4. The electrochemical measurement system as set forth in claim 1, wherein the plurality of reactors are a plurality of wells arranged in a matrix in a microplate, the electrochemical measurement system further comprising:
a moving mechanism which is configured to be moved relative to the microplate and which has the second probe attached thereto such that the second probe is configured to be coupled to the one of the electrodes in the pair.

5. The electrochemical measurement system as set forth in claim 1, wherein:
the plurality of reactors are a plurality of wells arranged in a matrix in a microplate; and
the plurality of types of solutions contain a respective plurality of types of electrolytes.

6. An electrochemical screening method comprising the steps of:
a) dispensing, in accordance with information relating to dispensing operation, a plurality of types of solutions into a plurality of reactors arranged in a matrix in a microplate, the plurality of types of solutions being mixtures of a plurality of mother liquids in different proportions;
b) simultaneously measuring electrical characteristics of the plurality of types of solutions in the respective plurality of reactors by moving an electrode member toward the plurality of reactors so that a plurality of pairs of electrodes attached to the electrode member are simultaneously inserted into the respective plurality of reactors; and
c) screening, with high throughput, the plurality of types of solutions to find one or more types of solutions having one or more predetermined electrical characteristics, by statistically processing data of the electrical characteristics of the plurality of types of solutions measured in step b) in accordance with the information relating to dispensing operation.

7. An electrochemical measurement system comprising:
a plurality of reactors which are arrayed and which contain a respective plurality of types of solutions;
an electrode member configured to be inserted into the plurality of types of solutions contained in the plurality of reactors; and
a plurality of pairs of electrodes for use in measuring electrical characteristics of the respective plurality of types of solutions,
wherein:
the plurality of pairs of electrodes are attached to the electrode member,
the plurality of pairs of electrodes are attached to the respective plurality of reactors, or
one of the electrodes in each of the plurality of pairs of electrodes is attached to the electrode member and the other is attached to a corresponding one of the plurality of reactors.

8. The electrochemical measurement system as set forth in claim 7, wherein the electrode member includes the plurality of pairs of electrodes which protrude toward the respective corresponding plurality of reactors.

9. The electrochemical measurement system as set forth in claim 8, wherein each of the electrodes in each of the plurality of pairs of electrodes has slant faces which are arranged such that a gap between the electrodes widens with increasing distance from a center of the gap and with decreasing distance to opposite ends of the gap when seen from a corresponding one of the plurality of reactors.

* * * * *